United States Patent
Jonsson et al.

(10) Patent No.: US 8,199,867 B2
(45) Date of Patent: Jun. 12, 2012

(54) INTERFERENCE SUPPRESSION IN BIT-SERIAL DATA STREAMS

(75) Inventors: Bengt Erik Jonsson, Delsbo (SE); Per Lars Paul Ingelhag, Alingsas (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 984 days.

(21) Appl. No.: 12/089,642

(22) PCT Filed: Oct. 14, 2005

(86) PCT No.: PCT/SE2005/001546
§ 371 (c)(1), (2), (4) Date: Apr. 9, 2008

(87) PCT Pub. No.: WO2007/043926
PCT Pub. Date: Apr. 19, 2007

(65) Prior Publication Data
US 2008/0232509 A1   Sep. 25, 2008

(51) Int. Cl.
*H04L 7/00* (2006.01)

(52) U.S. Cl. ........ 375/366; 375/285; 375/295; 375/296; 375/346; 375/363; 375/365; 375/367; 375/368; 375/369; 375/354; 370/503; 370/509; 370/510; 370/515; 714/701; 714/777

(58) Field of Classification Search ............... 375/286, 375/368, 371, 354, 363, 365, 366, 367, 369, 375/285, 295, 296, 346; 455/516; 370/503, 370/509, 510, 515; 714/701, 777
See application file for complete search history.

(56) References Cited

U.S. PATENT DOCUMENTS

| | | | | |
|---|---|---|---|---|
| 4,605,921 A * | 8/1986 | Riddle et al. | | 714/753 |
| 4,914,618 A * | 4/1990 | Dodge | | 713/600 |
| 5,339,337 A * | 8/1994 | Levine | | 375/366 |
| 5,432,786 A * | 7/1995 | Kawada | | 370/480 |
| 7,353,436 B2 * | 4/2008 | Taha et al. | | 714/701 |
| 7,400,988 B2 * | 7/2008 | Tabatabaei | | 702/69 |
| 7,430,262 B2 * | 9/2008 | Forte | | 375/367 |
| 7,580,472 B2 * | 8/2009 | Lablans | | 375/286 |
| 7,724,783 B2 * | 5/2010 | Shvodian et al. | | 370/515 |

* cited by examiner

Primary Examiner — Leon Flores
(74) Attorney, Agent, or Firm — Roger S. Burleigh

(57) ABSTRACT

Described is an apparatus for suppressing spurious spectral lines in a frame based bit-serial data stream, in which frames include payload data and frame markers. The apparatus includes means (16) for randomizing first frame marker elements (START) in a first position within each frame and means (18) for correlating second frame marker elements (STOP) in a second position within each frame with the randomized first frame marker element.

11 Claims, 9 Drawing Sheets

INTERFERENCE SUPPRESSION IN BIT-SERIAL DATA STREAMS

TECHNICAL FIELD

The present invention relates to suppression of interference, and particularly to suppression of spurious spectral lines in frame based bit-serial data streams.

BACKGROUND

In, for example, digital radio designs there are a large number of signal paths containing high-speed, high-resolution digital data. Typical examples are: (a) from an ADC (Analog-to-Digital Converter) to a subsequent DSP (Digital Signal Processor); (b) from a DSP to a DAC (Digital-to-Analog Converter) used in a radio transmitter; (c) between DSPs within a radio base station; (d) between sub-systems within a radio base station, e.g. between different boards.

It is desirable to reduce the amount of routing between ASICs (Application Specific Integrated Circuits), FPGAs (Field-Programmable Gate Arrays), ADCs and DACs. In order to do that, DSPs and data-converter parts are migrating towards the use of bit-serial, rather than bit-parallel digital interfaces. Some benefits are:

- The digital interface between ADCs/DACs and ASICs results in a substantially reduced number of bus wires, thus reducing the board space occupied by signal routing.
- Dramatically reduced number of output/input pins per component allows for integration of more functionality in a single package, thus further reducing board space. An example is dual/quad/octal ADCs/DACs. It also theoretically enables a larger number of digital signal paths to be handled by a single ASIC before becoming constrained by the pin-count.
- A bit-serial interface may use any available electrical standards, such as LVDS (Low-Voltage Differential Signaling) and CML (Current-Mode Logic), or a custom technology. Available coding standards, such as 8 b/10 b-coding may or may not be used, and the clock may or may not be embedded in the data bit-stream (for very high bit-rates, e.g. over 1 Gb/s, an embedded clock/sync is usually preferred over an extra clock line in parallel with the data).

A bit-serial channel with embedded clock/sync has the disadvantage that frame marker bits or bit patterns have to be inserted into the transmission to mark the start and/or stop of a transmission frame. The repetitive nature of such start/stop markers generates spurious spectral lines at $k*f_b/n$, where $f_b$ is the bit-rate of the bit-serial channel, n is the transmission frame length in bits, and k is an integer. The end result is that these spurious spectral lines may lead to undesirable interference.

SUMMARY

An object of the present invention is to suppress spurious spectral lines in bit-serial data streams with frame markers.

This object is achieved in accordance with the attached claims.

Briefly, the present invention is based on the idea of randomizing a part of the frame markers to remove the repetitive marker patterns and to correlate another part to the randomized part. In this way the spurious spectral lines originating from these patterns are converted into wide-band noise. The result is that no particular frequency component dominates the spectrum, which reduces the interference. Due to the correlation between the parts of each frame marker the received data stream may easily be synchronized at the receiving end without any knowledge of the randomization algorithm used at the transmitting end.

BRIEF DESCRIPTION OF THE DRAWINGS

The invention, together with further objects and advantages thereof, may best be understood by making reference to the following description taken together with the accompanying drawings, in which.

DETAILED DESCRIPTION

Before the invention is described in detail, a few applications of bit-serial interfaces will be described with reference to FIG. 1-4.

Figure 1:
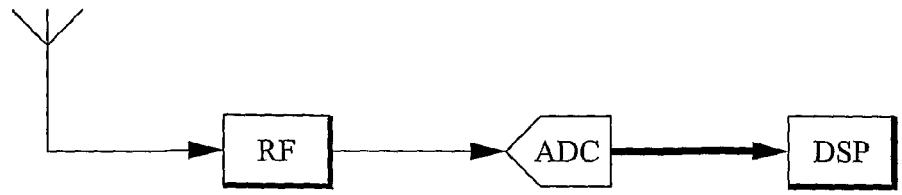
FIG. 1 is an example of an application involving a bit-serial interface.

FIG. 1 is an example of an application of a bit-serial interface. In this case analog RF (Radio Frequency) signal is received by an RF-stage, where it is digitized by an ADC (either directly at RF or after down-conversion to intermediate frequency or baseband). Conventionally the ADC has been connected to a DSP over a bit-parallel interface represented by the solid arrow. The reason is that the ADC delivers the bits of digital samples in parallel. However, as noted above, the present trend is to replace the bit-parallel interface with a bit-serial interface.

Figure 2:
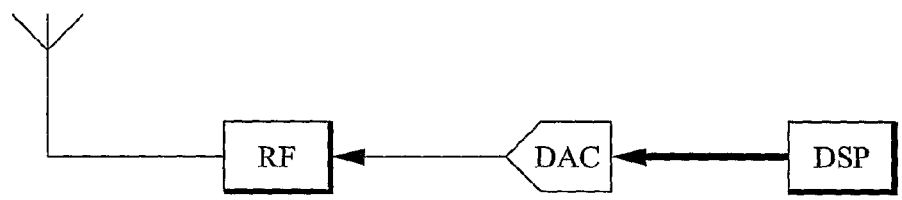
FIG. 2 is another example of an application involving a bit-serial interface.

FIG. 2 is another example of an application of a bit-serial interface. This is essentially the reverse of FIG. 1. As in the example of FIG. 1 the conventionally used bit-parallel interface between the DSP and DAC may be replaced by a bit-serial interface.

Figure 3:
FIG. 3 is another example of an application involving a bit-serial interface.

FIG. 3 is an example involving a bit-parallel interface between two DSPs, which may be replaced by a bit-serial interface.

Figure 4:
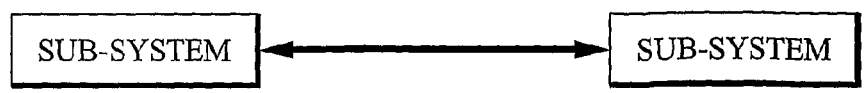
FIG. 4 is another example of an application involving a bit-serial interface.

FIG. 4 is an example involving a bit-parallel interface between two subsystems, for example two printed circuit boards, which may be replaced by a bit-serial interface.

The basic principles of a bit serial interface will now be described with reference to FIG. 5 and 6.

Figure 5:
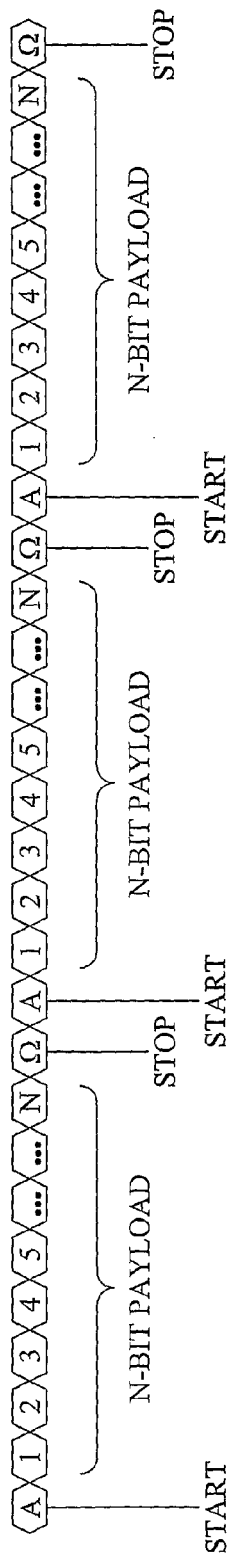
FIG. 5 illustrates the format of a typical bit-serial data stream.

FIG. 5 illustrates the format of a typical bit-serial data stream. The actual useful data, typically called payload, is divided into N-bit sequences framed by a marker or marker pattern [A, Ω]. As an example, the N-bit payload may include 8 data bits (in another embodiment the payload may include 7 data bits and a parity bit) surrounded by a first marker element forming a start bit A and a second marker element forming a stop bit Ω. The marker [A, Ω] is typically selected among the following alternatives:

[A, Ω]=[0,0], [0,1], [1,0] or [1,1]

Figure 6:
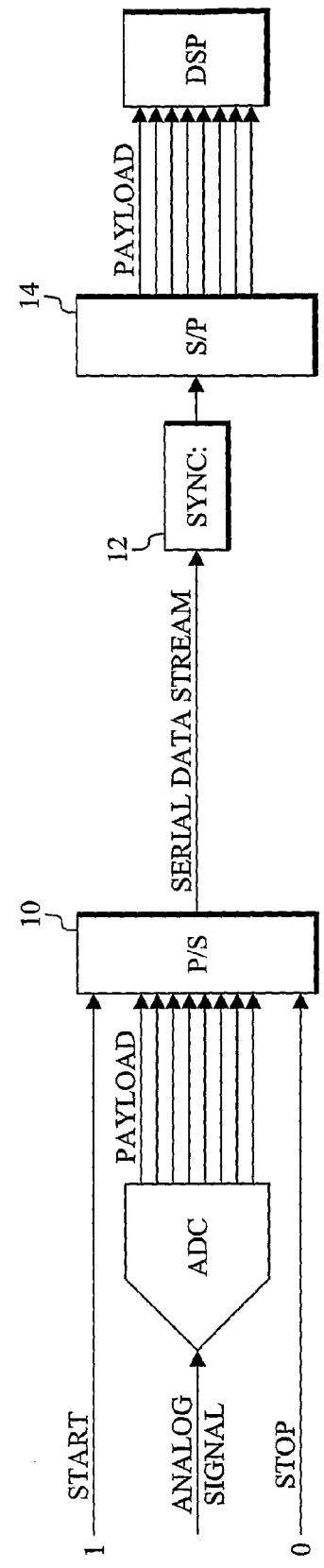
FIG. 6 is a block diagram illustrating the principles of a conventional bit-serial interface.

FIG. 6 is a simple block diagram illustrating the principles of a conventional bit-serial interface. This example illustrates an ADC connected to a DSP over a bit-serial interface. On the transmitting side the bit-serial interface includes a parallel-to-serial converter 10. Each digitized 8-bit sample is framed by a start bit A=1 and a stop bit Ω=0 and then the resulting 10 bits are converted into bit-serial form by converter 10.

On the receiving side of the bit-serial interface, a synchronizer 12 detects the repeated and known [1,0] marker formed by the start/stop bits. After synchronization the payload bits are forwarded to a serial-to-parallel converter 14, which outputs the original digitized samples in parallel form to the DSP for digital signal processing.

Figure 7:
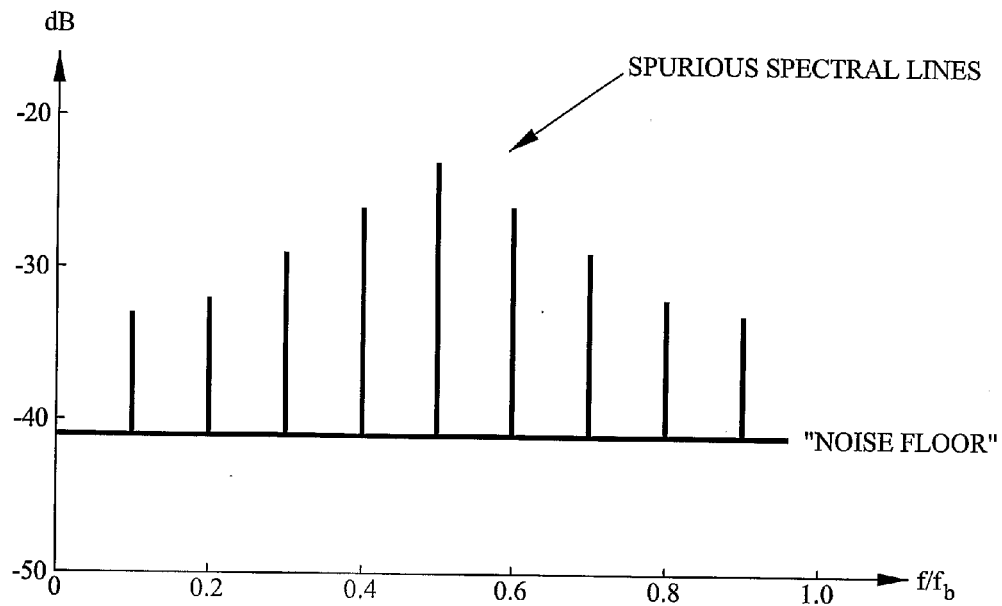
FIG. 7 illustrates the essential features of the spectrum of a typical bit-serial data stream generated by the interface in FIG. 6.

The detection of the synchronization or marker pattern is simple due to the fact that the marker pattern is repetitive and known on the receiving side of the interface. However, this simplicity has its price, as illustrated in FIG. 7, which shows the general features of the spectrum of a bit-serial data stream comprising 8-b random payload data using a 10-b frame with markers [A, Ω]=[1,0]. As shown, the repetitive nature of the markers generates spurious spectral lines at $k*f_b/10$ above the "noise level" produced by the random payload.

By using randomized frame markers in accordance with the present invention, the repetitive nature of the start/stop bits is scrambled and thus the spurious spectral lines seen in FIG. 7 will be transformed into wide-band noise, effectively removing these spurious spectral lines. The result will be a spectrum without pronounced interfering peaks at the cost of a slightly raised noise floor.

In accordance with an embodiment of the present invention the markers [A, Ω] may be selected among the following alternatives:

[A, Ω]=[$r_i$, $r_i$], [$r_i$, $\bar{r}_i$], [$\bar{r}_i$, $r_i$] or [$\bar{r}_i$, $\bar{r}_i$]

where $r_i$ is taken from a random bit-sequence, and $\bar{r}_i$ is the inverse of $r_i$. The random bit sequence can be generated with a pseudo-random binary number generator or a "true" random binary number generator (e.g. bits generated by digitizing a thermal noise voltage or a noisy signal) if the requirements on randomness are exceptionally high. Random number generation is well understood, and comprehensively treated in the literature, e.g. in [1,2], and is therefore not described here.

Figure 8:
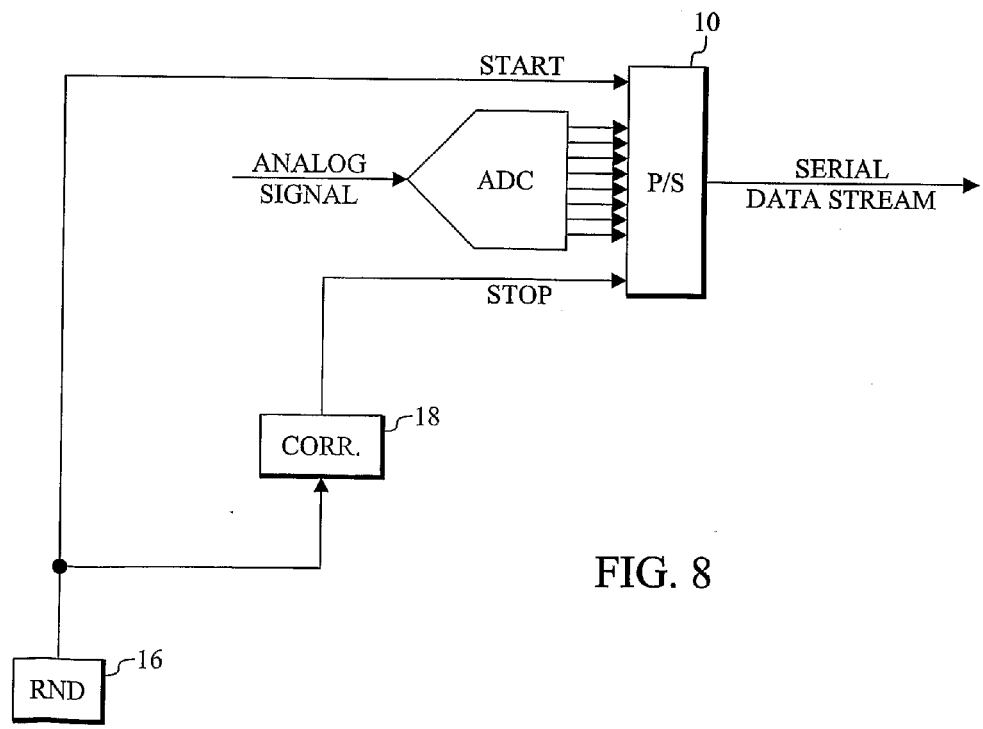
FIG. 8 is a block diagram of a first embodiment of the transmitting end of a bit-serial interface in accordance with the present invention.

FIG. 8 is a block diagram of a first embodiment of the transmitting end of a bit-serial interface in accordance with the present invention. A random signal generator 16 generates a pseudo random or genuinely random bit sequence. This bit sequence is forwarded to parallel/serial converter 10 to form a pseudo random or truly random start bit sequence. The bit sequence from random 30 signal generator 16 is also forwarded to a co-coordinating or correlating unit 18. The bit sequence from unit 18 is forwarded to parallel/serial converter 10 to form a stop bit sequence. The purpose of unit 18 is to co-ordinate each stop bit with the start bit in each marker. In one embodiment this may be done by inverting the value of each start bit. In a simpler embodiment the stop bits may be equal to the start bits, in which case unit 18 can be omitted, so that the stop bit simply will be a copy of the start bit. Furthermore, the roles of the start/stop bits may be reversed, i.e. the stop bit sequence may be (pseudo) random and control the start bit sequence.

Figure 9:
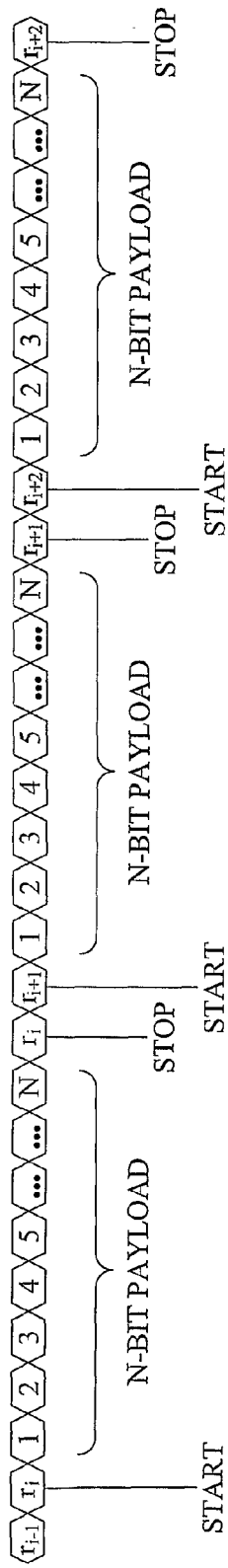
FIG. 9 illustrates a first embodiment of a bit-serial data stream provided with randomized markers in accordance with the present invention.
Figure 10:
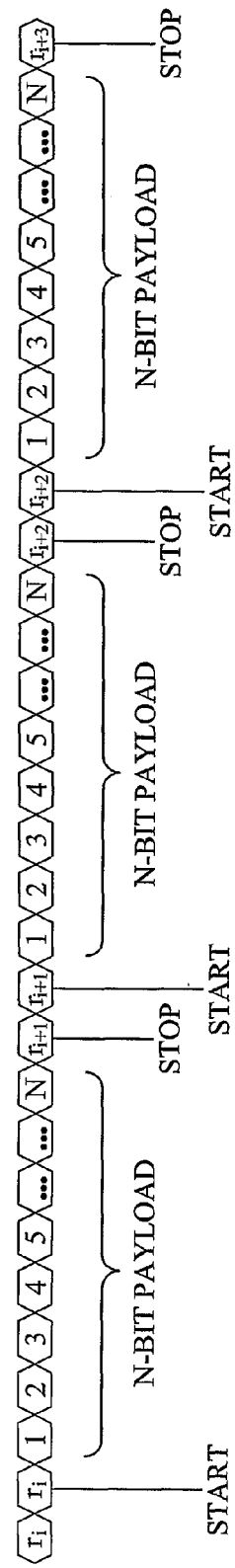
FIG. 10 illustrates a second embodiment of a bit-serial data stream provided with randomized markers in accordance with the present invention.

The exact pattern of start/stop (or sync) bits can be implemented with some variation without deviating from the underlying principle of the present invention. Two possible implementations are indicated in FIG. 9 and 10. FIG. 9 shows a start/stop format where the payload data is enclosed by the two correlated marker bits. FIG. 10 shows a "frame-divider" format where the payload data words are separated by two adjacent correlated marker bits.

Figure 11:
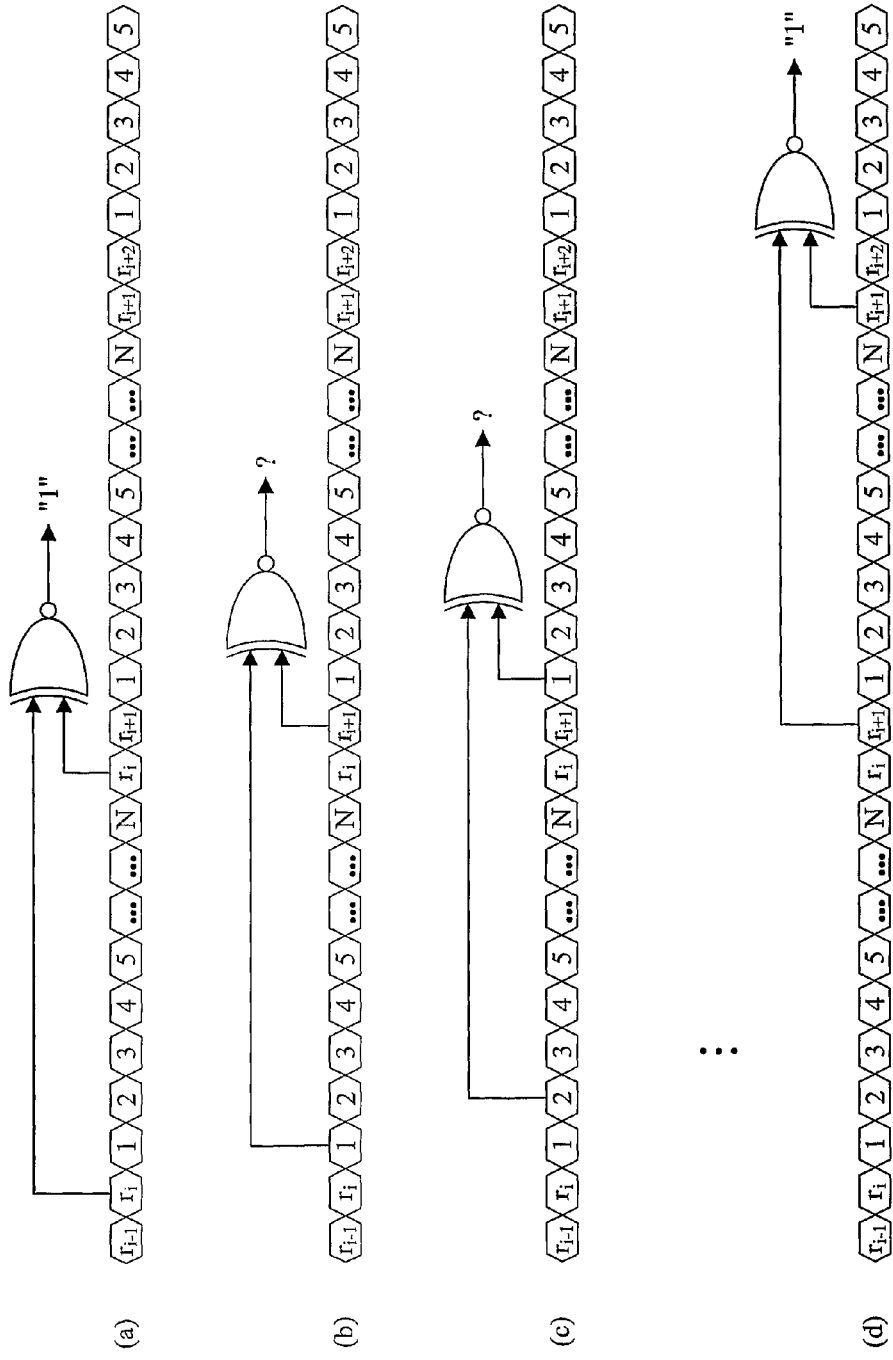
FIG. 11 illustrates the principles of frame synchronization of a bit serial data stream provided with randomized frame markers in accordance with the present invention.

FIG. 11 illustrates the principles of frame synchronization of a bit serial data stream provided with randomized frame markers in accordance with the present invention. In this embodiment the data stream is assumed to have the format illustrated in FIG. 9, i.e. the randomized start and stop bits are equal and enclose each frame. As illustrated in FIG. 11, the data stream slides through a detection window, which picks up two bits separated by the expected bit distance between the start and stop bits in a frame. These bits are forwarded to an inverting XOR gate, which outputs "1" if the bits are equal a "0" if they are not equal. Thus, the actual bit values are not essential. The essential feature is that they are equal (in this embodiment) at the synchronization position, such as the window position in FIG. 11(a). In this way the output is "1" with certainty when the window is in a synchronization position. In FIG. 11(b) the window has been shifted 1 bit position. In this case the output of the inverted XOR gate will be either "1" or "0", since data bit 1 of the payload and marker element $r_{i+1}$ have now been picked up by the window. Since there is no correlation between these bits, there is a 50% probability for each outcome. The same comments typically apply to the situation in FIG. 11(c), in which two data bits are compared (assuming that the payload bits are essentially uncorrelated). In FIG. 11(d) the next start/stop pair is encountered, which results in a "1" output from the inverted XOR gate with certainty.

Figure 12:
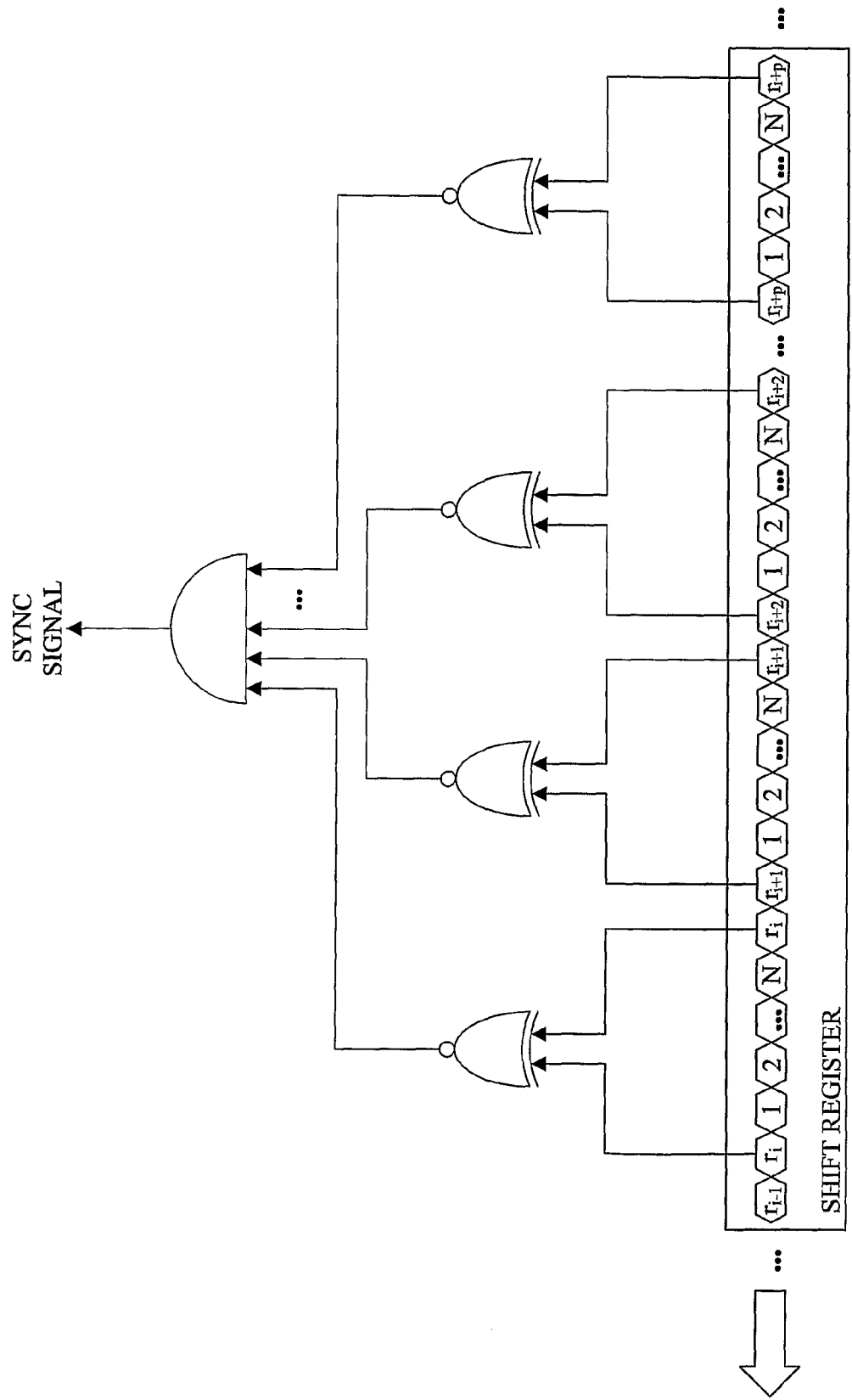
FIG. 12 is a first embodiment of an apparatus for synchronizing a bit-serial data stream provided with randomized frame markers in accordance with the present invention.

It is appreciated that occasionally the window will give a "1" output also in "non-marker" positions (typically with a rate of 50%), but that the marker positions will always give a "1" output. Thus, by monitoring the output of the window over several frames, the synchronizing position can be found by requiring that all windows that are separated by an integer number of frames must give a "1" output. FIG. 12 is an embodiment of an apparatus for synchronizing a bit-serial data stream based on this idea. In FIG. 12 the bit-serial data stream to be synchronized is forwarded to a shift register with a length of several frames, for example between 5 and 40 frames. The expected taps of start and stop bits are forwarded to corresponding inverted XOR gates, one for each frame. The outputs of the inverted XOR gates are connected to an AND gate, the output of which delivers a synchronization signal when all inverted XOR gates output a logical "1" signal, i.e. when all monitored bit positions of the shift register indicate that start/stop bits have been found. This is the situation illustrated in FIG. 12. If it can be assumed that the payload bits are essentially uncorrelated, it is very unlikely that false synchronization positions will be found. The probability of this to happen decreases very rapidly with the length of the shift register (or the number of monitored frames, p+1).

Figure 13:
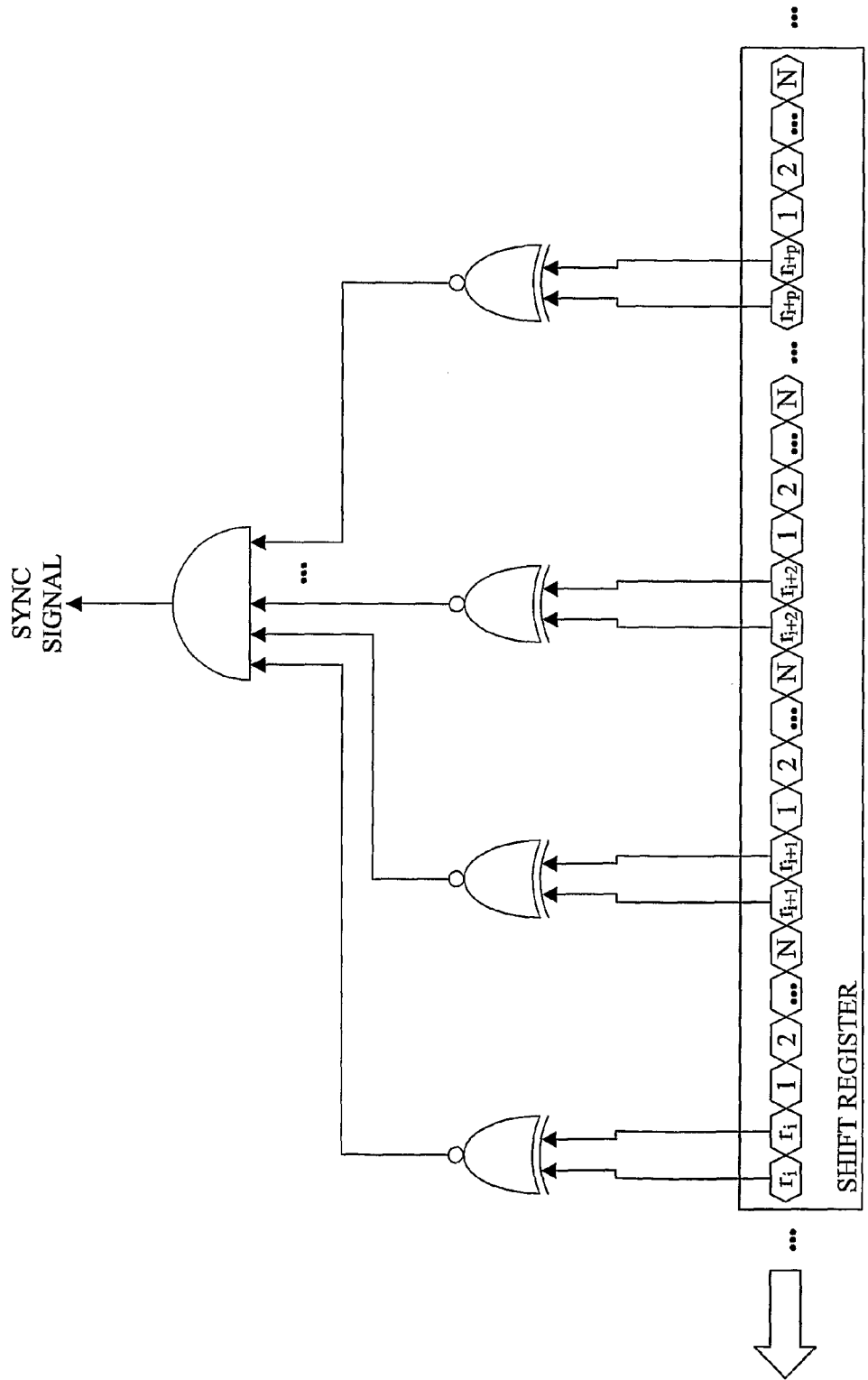
FIG. 13 is a second embodiment of an apparatus for synchronizing a bit-serial data stream provided with randomized frame markers in accordance with the present invention.

FIG. 13 is a second embodiment of an apparatus for synchronizing a bit-serial data stream provided with randomized frame markers in accordance with the present invention. This embodiment is tailored for the data stream format of FIG. 10. The difference with regard to the embodiment of FIG. 12 is that other shift register taps are monitored.

In the embodiments of FIG. 12 and 13 the start and stop bits were equal. However, embodiments where they are unequal (but correlated) may be obtained by simply omitting the inverters after the XOR gates.

Phase/sync-recovery in the receiver may improve if additional marker bits are inserted into the frame. This will guarantee an increased switching density of the bit-stream if this is desirable. Furthermore, placing additional marker bits at irregular intervals that do not repeat, e.g. positions {1, 3, 6, 10} in a 10-b frame, may help the phase locking of the receiver (However, it should be noted that liberal use of additional marker bits will waste significant transmission bandwidth.). If additional marker bits are used, these may be based on the same random bit $r_i$ as the other two marker bits—or they may be based on another (independent) random bit $s_i$ for smoother randomization of the markers and/or payload data. In the latter case they must be added in pairs, one randomized bit and one correlated bit. Random bits $s_i$ can be from the same random bit source as $r_i$, or a second random bit source. A second group of XOR or XNOR gates, similar to the ones shown in FIG. 12 and 13, detects the two or more $s_i$ marker bits. Full synchronization requires all $r_i$ and $s_i$ detectors to output "1".

As has been shown above, it is essential that the marker elements of a randomized marker are correlated to enable simple synchronization at the receiver. However, if a primary marker element is randomized, the secondary marker element(s) do not necessarily have to be equal or inverted versions of the primary element. Since the synchronization is based on the fact that the marker elements should be correlated, it is actually only required that they have a stronger correlation than the bits of payload data. Thus, the secondary marker elements may be generated from the primary marker elements by a function that has a slight built in randomness. This will further suppress the spurious spectral lines. However, in such an embodiment the inverted XOR gates in FIG. 12 and 13 will not always generate hits (an "1" output) in the correct synchronization position, which means that the AND gate has to be replaced by, for example, a counter that counts the number of hits. The synchronization position may then be found by selecting the position that gives the highest number of hits. Such a synchronization approach may also be desirable when the bit-serial data is transmitted over a noisy channel such that all frames are unlikely to be detected correctly.

Figure 14:
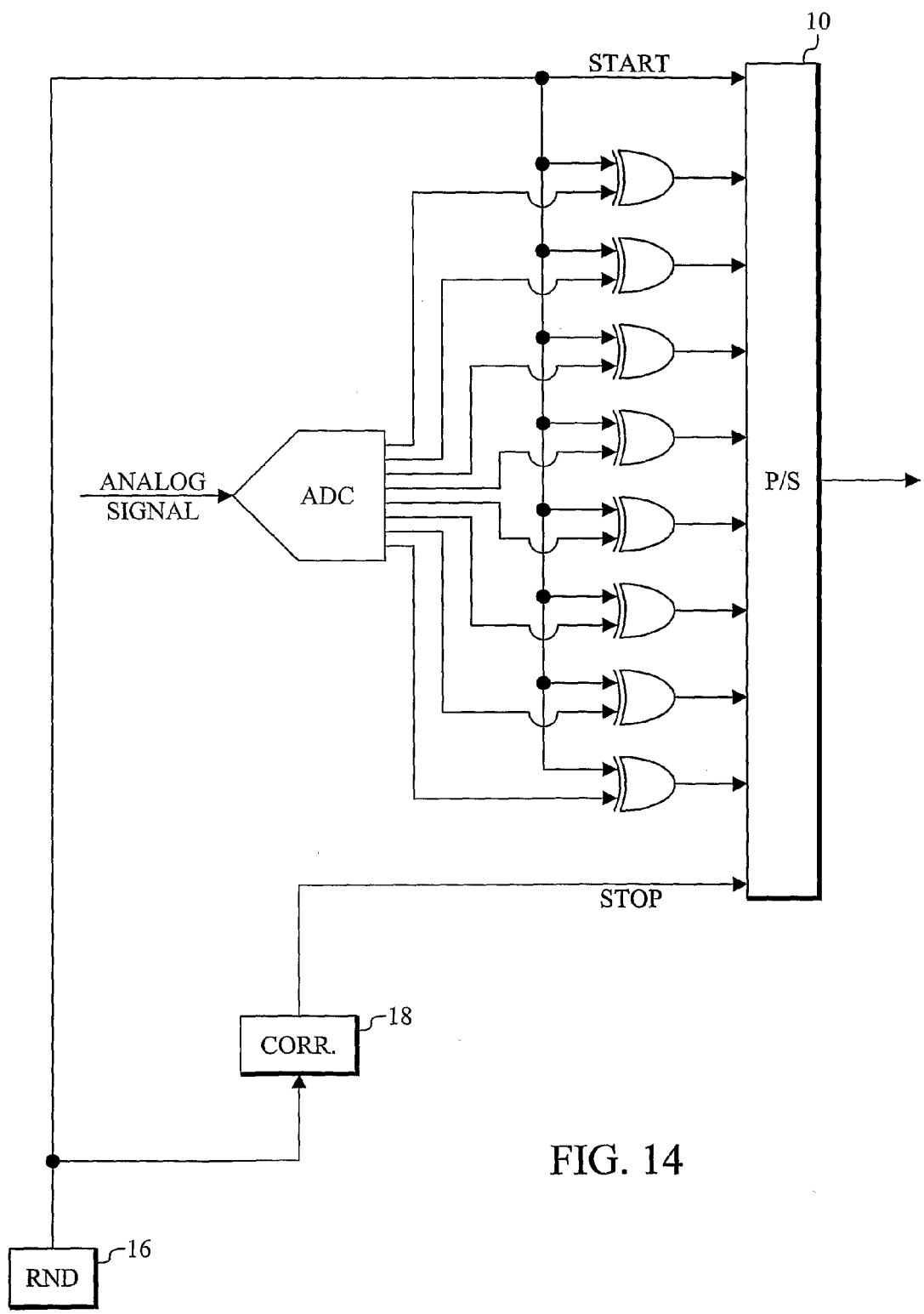
FIG. 14 is a block diagram of a another embodiment of the transmitting end of a bit-serial interface in accordance with the present invention.

In the above description it was assumed that the payload data transmitted over the bit-serial channel was random. In a general application that may not necessarily be true. There may be situations where a fixed-pattern or otherwise repetitive data (such as a carrier signal) is transmitted over the channel for an extended period of time. Such data has a spurious content of its own, and it will show up as spectral peaks or lines in the frequency spectrum even if the frame markers are randomized. In an embodiment of the present invention these spurious spectral lines may be suppressed by scrambling the payload data with the randomized frame markers already present in the transmission. Since the random bit $r_i$ used to create the frame markers originates from a random bit sequence, its actual value 0 or 1 varies randomly (or pseudo-randomly) from frame to frame. Thus it can also be used to scramble the transmitted payload data. A straightforward scrambling scheme would be to XOR the payload data bits with $r_i$ (or $\overline{r_i}$) as illustrated in FIG. 14. An important advantage of scrambling in accordance with the present invention is that the XOR key is already embedded in the transmitted data, which is critical to high bit-rate transmission channels. Optional parity bits may also be modified in this way.

If the marker elements include more than one bit, a part of the payload may be scrambled by a first random bit sequence $r_i$, and a second part may be scrambled by a second random sequence $s_i$, etc.

Figure 15:
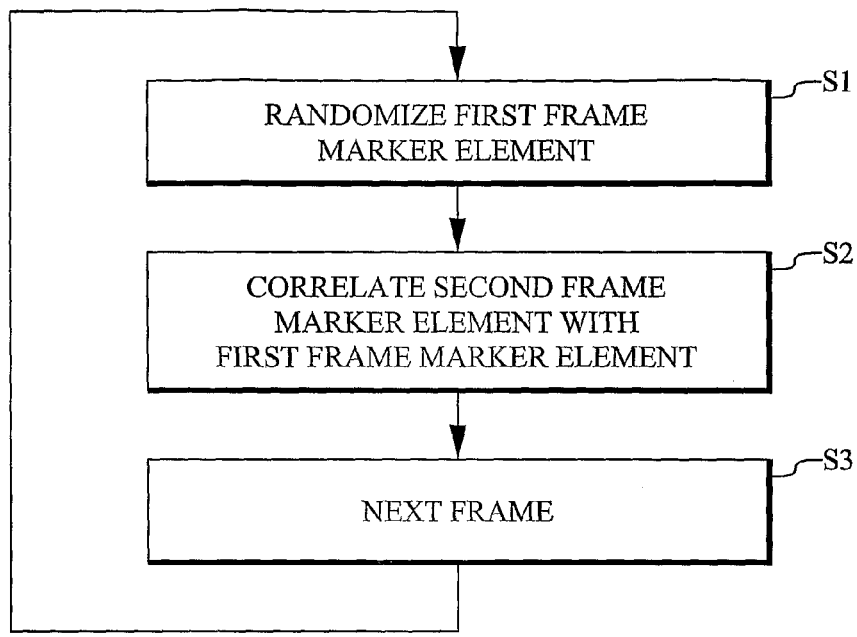
FIG. 15 is a flow chart illustrating an embodiment of the suppression method in accordance with the present invention.

FIG. 15 is a flow chart illustrating an embodiment of the suppression method in accordance with the present invention. Step S1 randomizes a first frame marker element in a given position in a frame. Step S2 correlates a second marker element in another position in the frame with the randomized first marker element. Step S3 goes to the next frame, and then the procedure is repeated.

Figure 16:
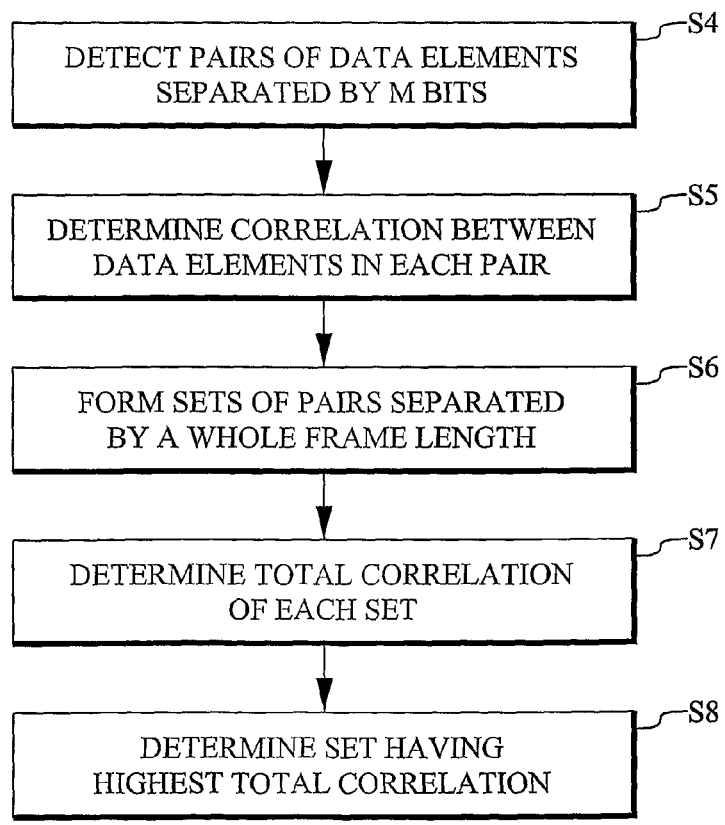
FIG. 16 is a flow chart of an embodiment of the synchronization method in accordance with the present invention.

FIG. 16 is a flow chart of an embodiment of the synchronization method in accordance with the present invention. Step S4 detects pairs of data elements separated by M bits, where M is the expected distance between first and second frame marker elements. Step S5 determines the correlation between data elements in each pair. Step S6 organizes the pairs into sets in such a way that each set includes pairs separated by a whole frame (the distance between the first data element in a pair and the first data element in the next pair is a frame length). Step S7 determines the total correlation for each set. Step S8 determines the set having the highest total correlation. This will determine the synchronization position.

Although the present invention has been described with reference to wired bit-serial interfaces, it is appreciated that the same principles may equally be applied to optical as well as wireless interfaces.

Furthermore, it is appreciated that the invention is not limited to single bit marker elements, but is also applicable to multi-bit marker elements.

The invention is also compatible with the insertion of additional data bits, e.g. for Padding data to a certain word length (or achieving a certain bit-rate in the channel).

Sending additional down-stream data, which may be used for system calibration/control/communication.

Additional parity/error-correction bits.

For the purpose of describing the invention these additional bits are equivalent to an increase in the content word length N, and thus already covered by the previous description.

Payload data can also be coded before framing/transmission in order to:

Improve switching density for improved phase recovery.

Otherwise aid phase-locking and reception on the receiver side.

Add error detection/correction beyond that of the parity bit.

Further control spectral content of payload data.

Achieve DC-neutrality in transmission.

There may be situations where one wishes to transmit N-b data words over a channel that has a different, fixed, frame size. Example: The channel has an n-b fixed frame-size including start/stop markers as previously described. The data source is an N-b ADC. Solution: Use the invention twice:
(1) Serialize the ADC source data using two frame-marker bits, and optional parity bits, as described previously. Scramble payload data here and/or in the next step.
(2) Transmit the serialized & framed data (including its marker & possible parity/dummy/control bits) by blindly splitting/combining it into chunks fitting the payload core of the channel with transmission frame length n.
(3) The receiver unpacks the payload chunks from the transmission frames and combines them into a secondary bit-stream, which is passed to the last step.
(4) In the last step, the secondary bit-stream is searched for frame markers, and the N-b data is unpacked and possibly de-serialized.

Using the invention in a multi-layered fashion enables the definition of a fixed-format channel interface (circuit block) that will handle phase locking and the raw transmission over the channel. The actual data format is handled in a second layer of packing/unpacking—thus it is to some extent separated from the operation of the channel itself.

The transmission channel of steps (2) and (3) in the previous section may use a different protocol than that of the invention. As an example, an 8 b/10 b channel may be used for the physical transmission layer. The invention can then be used to frame, and keep track of, the data content, as well as scrambling it in order to improve the spectral properties of the physical transmission.

In order to further suppress interference emissions in certain frequency bands, the random bit sequence used for randomization may be other than a white-noise sequence, i.e. a colored noise sequence. As an example, a low-pass shaped sequence would improve noise performance in the RF & IF bands, at the cost of increased noise in the baseband.

The present invention has several advantages, some of which are:
- The invention significantly suppresses the spurious frequency content of a synchronized bit-serial digital transmission, and thus leads to an improved performance in interference-sensitive systems—specifically in radio base-stations.
- Synchronization is simple and requires no knowledge of the algorithm or process used for randomization.
- It also has a very broad, general application for interference control in any interference-sensitive system where bit-serial digital interfaces are used.
- Payload data scrambling can be implemented with essentially zero-increase in complexity.
- With payload data scrambling, and a proper selection of random bit sequence, a statistically DC-neutral transmission can be guaranteed.
- The invention is applicable to the bit-serial transmission of data packages with arbitrary frame-lengths.

It will be understood by those skilled in the art that various modifications and changes may be made to the present invention without departure from the scope thereof, which is defined by the appended claims.

REFERENCES

[1] D. W. Clark, and L.-J. Weng, "Maximal and Near-Maximal Shift Register Sequences: Efficient Event Counters and Easy Discrete Logarithms", *IEEE Trans. Computers*, pp. 560-568, Vol. 43, No. 5, May 1994, IEEE.

[2] T. Ritter, "The Efficient Generation of Cryptographic Confusion Sequences", *Cryptologia*, pp. 81-139, Vol. 15, No. 2, Apr. 1991.

The invention claimed is:

1. A method of suppressing spurious spectral lines in a frame-based bit-serial data stream, wherein frames include payload data and frame markers, said method including the steps of:
   randomizing first frame marker elements in a first position within each frame; and,
   correlating second frame marker elements in a second position within each frame with said randomized first frame marker elements, whereby said frame marker elements result in wide-band noise rather than spurious spectral lines.

2. The method of claim 1, further including the step of scrambling payload data in each frame with one of said frame marker elements.

3. The method of claim 1, wherein each frame marker element is represented by a single bit.

4. The method of claim 1, further including the step of correlating at least one further frame marker element with said first frame marker element.

5. The method of claim 1, further including the step of randomizing and correlating at least one further frame marker element pair.

6. The method of claim 1, wherein randomization is performed by a colored noise sequence.

7. The apparatus of claim 6, further including means for randomizing and correlating further marker elements.

8. An apparatus for suppressing spurious spectral lines in a frame-based bit-serial data stream, in which wherein frames include payload data and frame markers, said apparatus including:
   means for randomizing first frame marker elements in a first position within each frame; and,
   means for correlating second frame marker elements in a second position within each frame with said randomized first frame marker elements, whereby said frame marker elements result in wide-band noise rather than spurious spectral lines.

9. The apparatus of claim 8, further including means for scrambling payload data in each frame with one of said frame marker elements.

10. The apparatus of claim 8, further including means for randomizing by a colored noise sequence.

11. An apparatus for transmitting a bit-serial data stream that includes a plurality of frames, wherein each of the frames includes payload data and frame marker elements, said apparatus comprising: a random signal generator adapted to randomize first frame marker elements in a first position each frame; and, a correlating unit adapted to correlate a second frame marker elements in a second position within each frame, wherein each second frame marker element is correlated with a corresponding randomized first frame marker element, whereby said frame markers elements result in wide-band noise rather than spurious spectral lines.

* * * * *

UNITED STATES PATENT AND TRADEMARK OFFICE
CERTIFICATE OF CORRECTION

PATENT NO.        : 8,199,867 B2                        Page 1 of 1
APPLICATION NO.   : 12/089642
DATED             : June 12, 2012
INVENTOR(S)       : Jonsson et al.

It is certified that error appears in the above-identified patent and that said Letters Patent is hereby corrected as shown below:

On the Title Page, in Item (75), under "Inventors", in Column 1, Line 2, delete "Alingsas" and insert -- Alingsås --, therefor.

In the Specifications:

In Column 4, Line 10, after "random", delete "30".

In the Claims:

In Column 8, Line 31, in Claim 7, delete "apparatus" and insert -- method --, therefor.

In Column 8, Line 59, in Claim 11, delete "markers" and insert -- marker --, therefor.

Signed and Sealed this
Seventh Day of May, 2013

Teresa Stanek Rea
*Acting Director of the United States Patent and Trademark Office*